United States Patent
Kawamura

Patent Number: 5,179,678
Date of Patent: Jan. 12, 1993

[54] ADDRESS/CONTROL SIGNAL INPUT CIRCUIT FOR A CACHE CONTROLLER WHICH CLAMPS THE ADDRESS/CONTROL SIGNALS TO PREDETERMINED LOGIC LEVEL CLAMP SIGNAL IS RECEIVED

[75] Inventor: Eiji Kawamura, Tokyo, Japan

[73] Assignee: NEC Corporation, Tokyo, Japan

[21] Appl. No.: 637,962

[22] Filed: Jan. 9, 1991

Related U.S. Application Data

[63] Continuation of Ser. No. 242,140, Sep. 8, 1988, abandoned.

Foreign Application Priority Data

Sep. 8, 1987 [JP] Japan ................. 62-226015

[51] Int. Cl.[5] .................................. G06F 13/14
[52] U.S. Cl. .................... 395/425; 364/243.41; 364/238.4; 364/259.6; 364/245.7; 364/DIG. 1
[58] Field of Search .................................. 395/425

[56] References Cited

U.S. PATENT DOCUMENTS

| | | | |
|---|---|---|---|
| 4,090,236 | 5/1978 | Bennett | 364/200 |
| 4,112,490 | 9/1978 | Pohlman | 364/200 |
| 4,245,307 | 1/1981 | Kapeghian | 364/200 |
| 4,458,313 | 7/1984 | Suzuki | 364/200 |
| 4,575,792 | 3/1986 | Keeley | 364/200 |
| 4,602,327 | 7/1986 | La Violette | 364/200 |
| 4,720,811 | 1/1988 | Yamaguchi et al. | 364/900 |
| 4,809,167 | 2/1989 | Pawloski | 364/200 |
| 4,819,158 | 4/1989 | Miyashita | 364/200 |
| 4,835,678 | 5/1989 | Kofuji | 364/200 |
| 4,860,244 | 8/1989 | Bruckert | 364/900 |
| 4,888,689 | 12/1989 | Taylor | 364/900 |

Primary Examiner—Lawrence E. Anderson
Assistant Examiner—Eric Coleman
Attorney, Agent, or Firm—Foley & Lardner

[57] ABSTRACT

A cache controller is coupled to a cache memory coupled through a bus to a microprocessor, for controlling the cache memory in response to a signal from the microprocessor. The cache controller comprises an address signal terminal and a control signal terminal for receiving an address signal and a control signal from the microprocessor, and a clamp signal terminal for receiving a clamp signal from the microprocessor. The cache controller also includes an input circuit coupled to the address signal terminal, the control signal terminal and the clamp signal terminal for outputting the address signal and the control signal as they are when the clamp signal is inactive and for generating an output address signal and an ouput control signal having a predetermined logic level when the clamp signal is active.

10 Claims, 4 Drawing Sheets

ADDRESS/CONTROL SIGNAL INPUT CIRCUIT FOR A CACHE CONTROLLER WHICH CLAMPS THE ADDRESS/CONTROL SIGNALS TO PREDETERMINED LOGIC LEVEL CLAMP SIGNAL IS RECEIVED

This application is a continuation of application Ser. No. 07/242,140, filed Sept. 8, 1988, now abandoned.

BACKGROUND OF THE INVENTION

1. Field of the Invention

The present invention relates to a microprocessor, and more specifically to a controller for a cache memory incorporated in the microprocessor.

2. Description of Related Art

At present, most microcomputers have a high speed memory called a "cache memory" (simply called a "cache" hereinafter) in addition to the usual (external) main memory and secondary memories. In general, the access speed to the main memory is very slow, for example a few tenths to a few hundredths of the internal processing speed of a microprocessor or central processing unit (CPU), and therefore, if the microprocessor fetches necessary programs and data from the main memory at each execution of an instruction, the operation speed of the microprocessor is limited by the access speed of the main memory. In other words, high speed processing cannot be expected. For solving this problem, the cache has been proposed and is widely used at present. The cache copies a portion of the programs and data that are stored in the main memory and that are most heavily used, and in the operation of the microcomputer, the microprocessor accesses the cache (i.e., high speed access memory) internally provided in the microcomputer in place of accessing the external main memory, so that the microprocessor can execute the operation at a high speed.

In a cache associated to a microprocessor, hitherto, an address signal from the microprocessor is preferably directly supplied to the cache in order to make as short as possible a time from the moment the address signal is outputted from the microprocessor to the moment there is discriminated whether or not the cache is hit. However, some microprocessors are adapted such that when the microprocessor is in a RESET condition, in an INTERRUPT condition or in a BUS HOLD condition, output terminals of the microprocessor are put in a high impedance condition. If the output signals of this type of microprocessor are directly coupled to the cache as mentioned above, an intermediate level propagation will occur, so that inputs of the cache become logically unstable.

In order to overcome the above drawback, it has been proposed to pull up the signal lines from the microprocessor to the cache, so that when an input signal will not been put in the high impedance condition. However, pull-up resistors and their associated connection lines for the pull-up purpose will inevitably induce a floating or parasitic capacitance, which will cause a delay in signal propagation. This delay will often give rise to a significant adverse influence on the timing of an operation of cache controller.

SUMMARY OF THE INVENTION

Accordingly, it is an object of the present invention to provide a cache controller which has overcome the above mentioned defect of the conventional one.

Another object of the present invention is to provide a cache controller capable of logically stabilizing the input signal without pulling up the input signal line.

Still another object of the present invention is to provide a cache controller capable of logically stabilizing the input signal without pulling up the input signal line and capable of minimizing the delay of the input signal propagation.

The above and other objects of the present invention are achieved in accordance with the present invention by a cache controller coupled to a cache memory coupled through a bus to a microprocessor for controlling the cache memory in response to a signal from the microprocessor, comprising an address signal terminal and a control signal terminal for receiving an address signal and a control signal from the microprocessor, a clamp signal terminal for receiving from the microprocessor a clamp signal which is rendered active when the microprocessor brings, into a high impedance condition, terminals of the microprocessor for outputting the address signal and the control signal, and input means coupled to the address signal terminal, the control signal terminal and the clamp signal terminal for outputting the address signal and the control signal as they are when the clamp signal is inactive and for generating an internal address signal and an internal control signal having a predetermined logic level when the clamp signal is active.

With the above mentioned arrangement, if the clamp signal is active, the output address signal and the output control signal having the predetermined logic level are generated. Therefore, when the address signal and the control signal outputted from the microprocessor are brought into a high impedance condition, the clamp signal is rendered active, and accordingly, the adverse influence of the high impedance will be prevented. In addition, since there is no pull-up circuit for the address signal and the control signal, a delay of these signals inputted to the cache memory is minimized.

The above and other objects, features and advantages of the present invention will be apparent from the following description of preferred embodiments of the invention with reference to the accompanying drawings.

DESCRIPTION OF THE PREFERRED EMBODIMENTS

Figure 1:
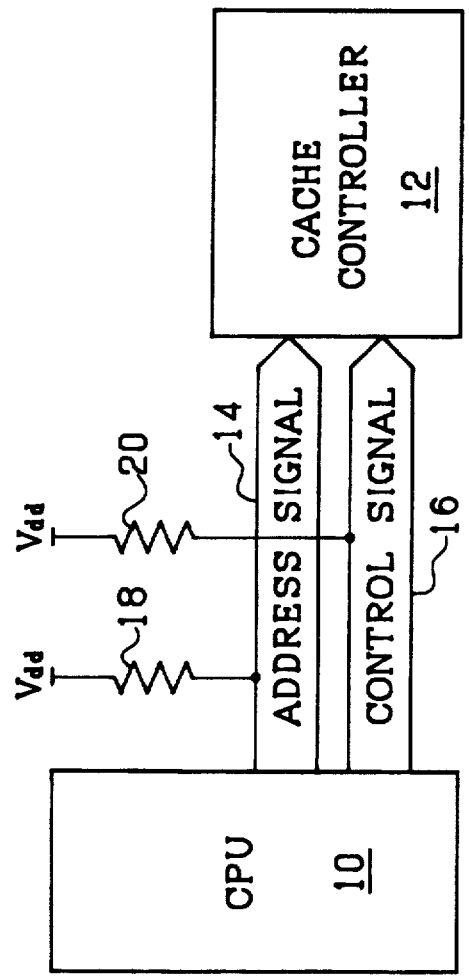
FIG. 1 is a block diagram of one example of a conventional cache controller.

Referring to FIG. 1, there is shown a diagram of one example of a conventional cache controller. The shown system includes a CPU 10, and a cache controller 12 coupled to the CPU 10 through an address bus 14 and a control bus 16 so that the cache controller 12 receives an address signal and a control signal from the CPU 10. In addition, the address bus 14 and the control bus 16 are pulled up through resistors 18 and 20 to a supply voltage Vdd, respectively.

Thus, the address signal and the control signal outputted from the CPU 10 are pulled up through the resistors 18 and 20, and then inputted to the cache controller 12. Therefore, for example, when the address signal outputted from the CPU 10 is at a logically low level, the logically low level address signal is inputted to the cache controller 12. When the address signal outputted from the CPU 10 is at a logically high level, the logically high level address signal is inputted to the cache controller 12. In addition, when the address signal outputted from the CPU 10 is in a high impedance condition, a logically high level address signal is then inputted to the cache controller 12. Namely, the cache controller 12 will not directly receive the address signal in a high impedance condition.

In the system shown in FIG. 1, however, since the address bus 14 and the control bus 16 are pulled up through the resistors 18 and 20, floating or parasitic capacitances attributable to the pull-up resistors 18 and 20 and their associated connection lines for pull-up will cause a delay in signal propagation. Namely, the time of signal propagation from the moment the address signal or the control signal is actually outputted from the CPU 10 to the moment the address signal or the control signal is actually inputted to the cache controller 12 will become longer than a case in which the address signal and the control signal are not pulled up.

On the other hand, the cache controller 12 should be made to minimize the time from when the address signal is inputted to the moment a hit signal is outputted. Accordingly, the address signal should be inputted to the cache controller as soon as possible. For this reason, the cache controller is constructed to operate at a high speed.

However, the delay caused by the floating or parasitic capacitances attributable to the pull-up resistors 18 and 20 and their associated connection lines will give a significant adverse influence on the operation of the cache controller, particularly on a critical pass on the timing.

Figure 2:
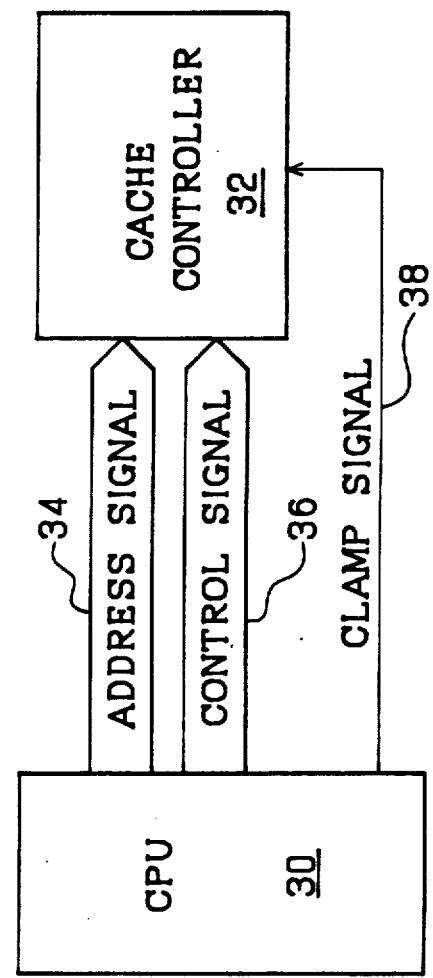
FIG. 2 is a block diagram illustrating a basic construction of the cache controller in accordance with the present invention.

Referring to FIG. 2, there is shown a block diagram illustrating a basic construction of the cache controller in accordance with the present invention.

The shown system includes a CPU 30, and a cache controller 32 coupled to an address bus 34 and a control bus 36 which are also coupled to the CPU 30 so that the cache controller 32 receives an address signal and a control signal directly from the CPU 30 through no intermediary of a pull-up circuit. In addition, the cache controller 32 is made to receive a clamp signal through a clamp signal line 38 from the CPU 30.

Figure 3:
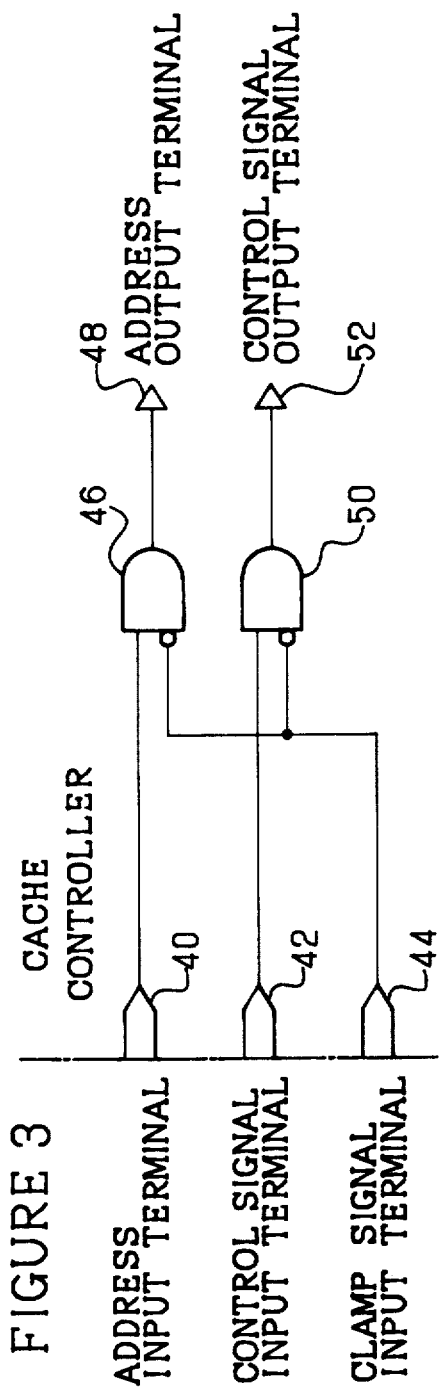
FIG. 3 is a block diagram of a first embodiment of the input circuit of the cache controller embodying the present invention.

Turning to FIG. 3, there is shown a block diagram of a first embodiment of an input circuit of the cache controller shown in FIG. 2.

The shown input circuit is provided as an internal circuit of the cache controller 32 shown in FIG. 2 and includes three input terminals as external terminals of the cache controller 32. A first input terminal is an address input temrnal 40 coupled to the address bus 34 for receiving the address signal from the CPU 30. A second terminal is a control signal input terminal 42 coupled to the control bus 36 for receiving the control signal from the CPU 30. A third terminal is a clamp signal input terminal 44 coupled to the clamp signal line 38 for receiving the clamp signal from the CPU 30.

The input circuit also includes a first AND gate 46 having a first, non-inverted, input connected to the address input terminal 40 and a second, inverted, input connected to the clamp signal terminal 44. This first AND gate 46 has an output connected to an address output terminal 48 that is provided as an internal terminal of the cache controller 32. In addition, a second AND gate 50 is connected at its first, non-inverted, input to the control signal input terminal 42 and at its second, inverted, input to the clamp signal terminal 44. This second AND gate 50 is also connected at its output to a control signal output terminal 52 that is provided as an internal terminal of the cache controller 32.

For simplification of the drawing, the address input terminal 40, the control signal input terminal 42, the AND gates 46 and 50, the address output terminal 48 and the control signal output terminal 52 are shown as one terminal or gate in the drawing, respectively, but are actually provided in the number corresponding to the bit number of the address signal and the control signal, respectively.

In connection with the input circuit as mentioned above, the CPU 30 generates the clamp signal of a logically high level "1" when the address signal and the control signal are in the high impedance condition. Otherwise, the CPU outputs the clamp signal of a logically low level "0".

Thus, when the clamp signal is at a logically high level "1", the AND gates 46 and 50 are closed. Namely, without regard to the logic levels of the address signal and the control signal from the CPU 30, the first and second AND gates 46 and 50 output a signal of a logically low level "0", respectively, and therefore, all bits of the address output terminal 48 and all bits of the control signal output terminal 52 are brought into a logically low level "0".

On the other hand, when the clamp signal is at a logically low level "0", the AND gates 46 and 50 are opened. Therefore, the address signal and the control signal inputted to the address input terminal 40 and the control signal input terminal 42 from the CPU 30 are respectively passed without modification through the AND gates 46 and 50 to the address output terminal 48 and the control signal terminal 52. In the above mentioned signal propagation, since there is no pull-up circuit in a signal path for the address signal and the control signal, these signals are propagated with a minimum delay.

Figure 4:
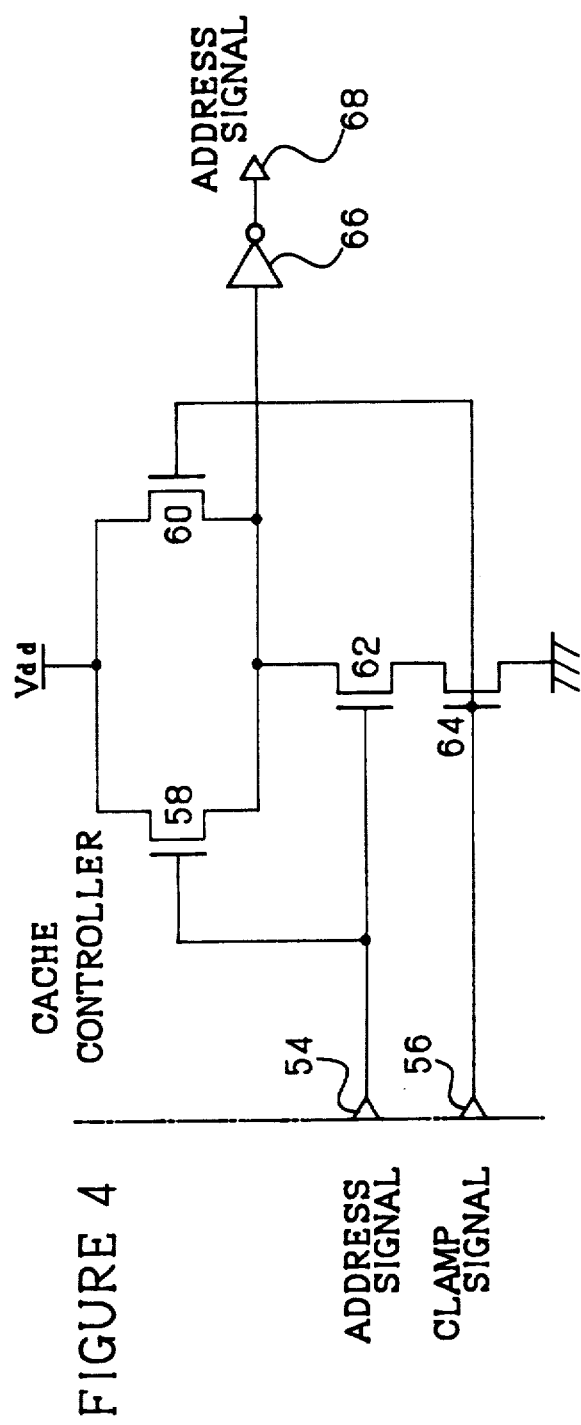
FIG. 4 is a circuit diagram of an AND gate used in the input circuit of the cache controller shown in FIG. 3.

Referring in FIG. 4, there is shown a circuit diagram of the AND gate used in the input circuit of the cache controlled shown in FIG. 3. Since the AND gates 46 and 50 are formed of AND circuits having the same construction, one AND circuit constituting the AND gate 46 will be explained with reference to FIG. 4. The shown AND circuit has a first input 54 connected to receive one bit of the address signal supplied to the address input terminal 40 and a second input 56 connected to receive an inverted signal of the clamp signal supplied to the clamp signal input terminal 44.

The first input 54 and the second input 56 are connected to respective gates of a pair of p-channel transistors 58 and 60 having commonly connected sources, which are in turn connected to a supply voltage Vdd. These p-channel transistors 58 and 60 are commonly connected at their drains, which are in turn connected through a pair of series-connected n-channel transistors 62 and 64 to ground. These n-channel transistors 62 and 64 are connected at their gates to the first and second inputs 54 and 56, respectively. In addition, a connection node between the commonly connected drains of the p-channel transistors 58 and 60 and a drain of the n-channel transistor 62 is connected to an input of an inverter 66, whose output is connected to an output terminal 68 corresponding to one bit of the address output terminal 48.

When a signal inputted to the second input 56 is of 0 V indicative of the logically low level, the n-channel transistor 64 is turned off, and on the other hand, p-channel transistor 60 is turned on. At this time, if the signal inputted to the first input 54 is at an intermediate level which might result from the high impedance condition of the address signal outputted from the CPU 30, the transistors 58 and 62 are put in an unsaturated condition. However, since the transistors 60 and 64 are on and off, respectively, a potential at the drain of the transistor 58 is put at 5 V of the supply voltage which indicates the logically high level. Therefore, the logically high level signal is inputted to the inverter 66, so that a logically low level signal is outputted to the output terminal 68. Thus, when the signal inputted to the second input 56 is at the low level, the output terminal 68 is maintained at the logically low level even if the signal inputted to the first terminal 54 is at an intermediate level.

On the other hand, when a signal inputted to the second input 56 is for example of 5 V indicative of the logically high level, the n-channel transistor 64 is turned on, and the p-channel transistor 60 is turned off. At this time, therefore, if the signal inputted to the first input 54 is at 5 V indicative of the logically high level, the transistors 58 is turned off and the transistor 62 are turned on so that the inverter 66 outputs the logically high level signal to the output terminal 68. If the signal inputted to the first input 54 is at 0 V indicative of the logically low level, the transistors 58 is turned on and the transistor 62 are turned off so that the inverter 66 outputs the logically low level signal to the output terminal 68.

As seen from the above, if the clamp signal is supplied to the second terminal 56, the output terminal 68 is locked to the logically low level even if the address signal is at an intermediate level which might be caused by the high impedance condition of the address signal outputted from the CPU 30.

Figure 5:
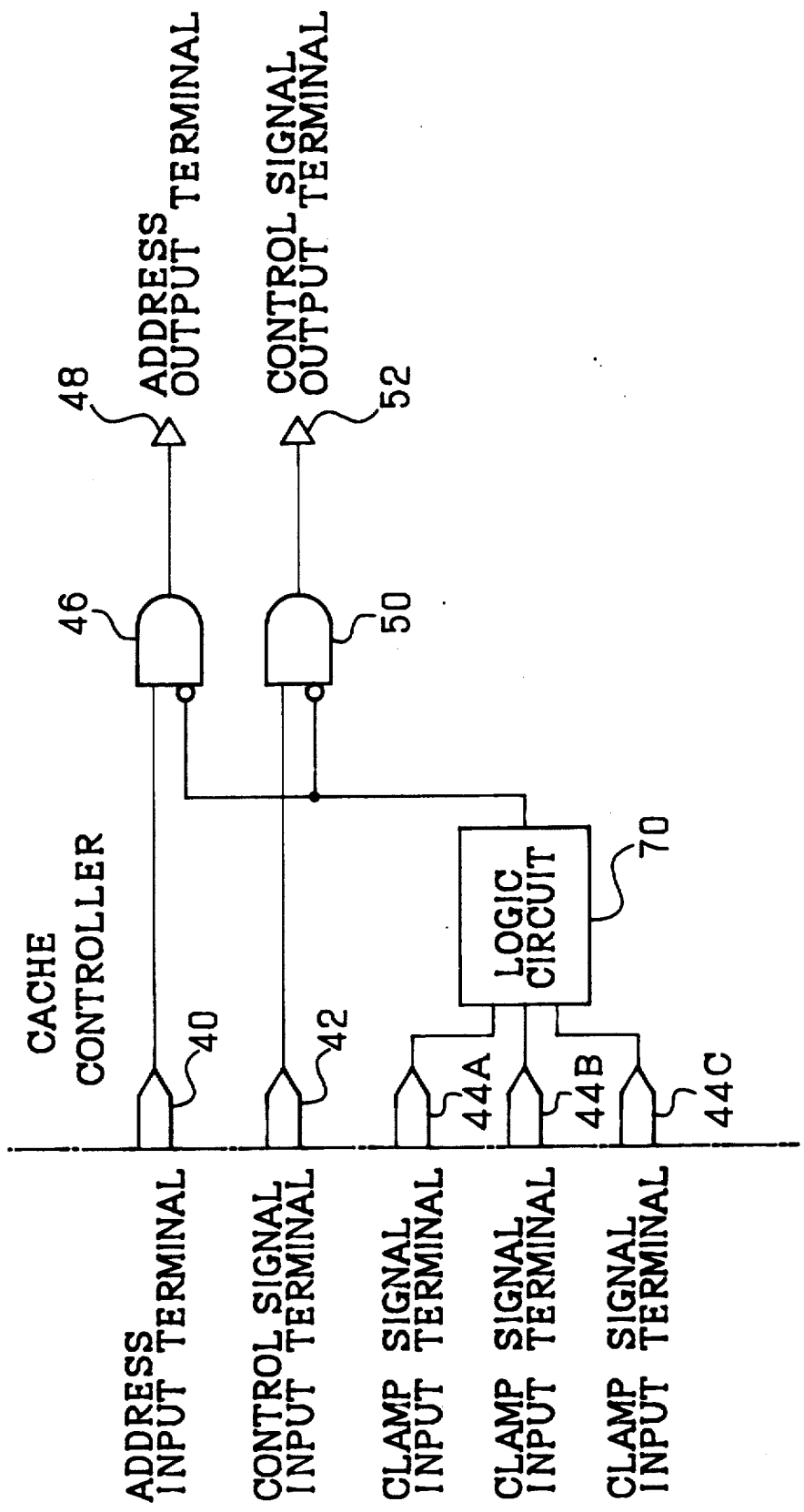
FIG. 5 is a block diagram of a second embodiment of the input circuit of the cache controller embodying the present invention.

Referring to FIG. 5 there is shown a block diagram of a second embodiment of the input circuit of the cache controller embodying the present invention. In FIG. 5, elements similar to those shown in FIG. 3 are given the same Reference Numerals, and explanation thereof will not be repeated.

As seen from comparison between FIGS. 3 and 5, the input circuit of the cache controller shown in FIG. 5 includes three clamp signal terminals 44A, 44B and 44C which are connected to a logic circuit 70 for generating a resultant clamp signal at a high speed in compliance with the system construction. The resultant clamp signal generated by the logic circuit 70 are coupled to the respective inverted inputs of the AND gates 46 and 50.

The operation of the FIG. 5 input circuit in response to the resultant clamp signal generated by the logic circuit 70 is the same as that of the FIG. 3 input circuit, and therefore, explanation of the operation will be omitted.

The logic circuit 70 receives the different signals through the clamp terminals 44A, 44B and 44C and executes a required logic operation on these received signals for generating the resultant clamp signal. The logical operation of the logic circuit 70 is determined dependently upon the system structure of the CPU 30. In the simplest example, the logic circuit 70 is of the OR gate so that the resultant clamp signal is generated if at least one of the signals inputted to the three clamp signal terminals 44A, 44B and 44C is brought into a high level. Provision of a plurality of clamp signal input terminals will make it possible to use different signals as the clamp signal.

As will be understood from the above description, the clamp signal defines the timing at which the address signal and/or the control signal are clamped to the predetermined logic level. Accordingly, in the case that a plurality of clamp signals are obtained from the CPU and a resultant clamp signal can be generated by executing a desired logical operation on these clamp signals, an optional selection of the type of the logic operation would make it possible to minimize the delay from the moment a clamp signal is inputted to one clamp input terminal to the moment the resultant clamp signal is actually generated. Therefore, it is possible to elevate the flexibility of the system including different types of cache memories.

Figure 6:
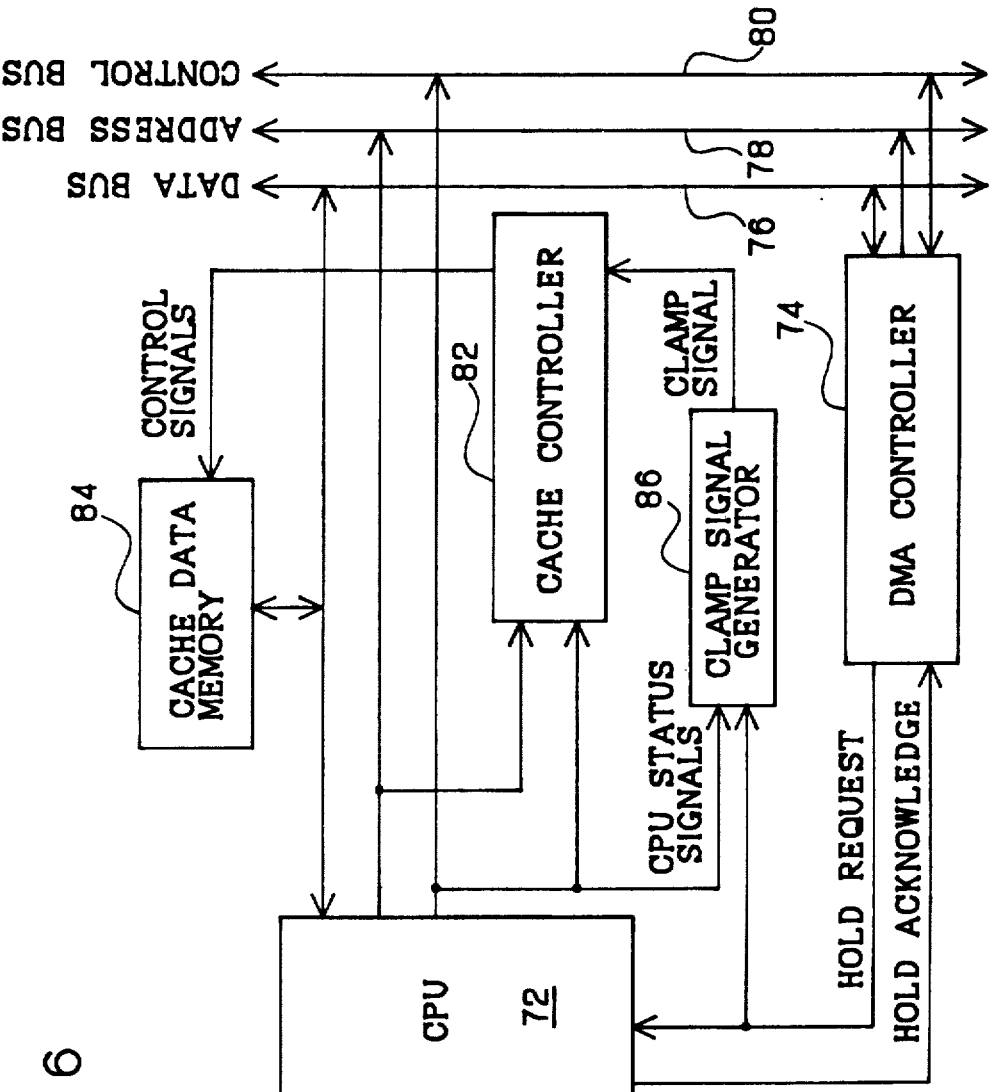
FIG. 6 is a block diagram of another embodiment of the cache controller embodying the present invention.

Referring to FIG. 6, there is shown a block diagram of a second embodiment of the cache controller embodying the present invention, in which a clamp signal is formed from a HOLD request signal outputted by a DMA controller to a CPU and status signals outputted by the CPU.

The shown system includes a CPU 72 and a DMA controller 74 which are coupled to a data bus 76, an address bus 78 and a control bus 80, respectively. The DMA controller 74 generates a HOLD request signal to the CPU 72, and the CPU 72 outputs a HOLD acknowledge signal to the DMA controller 74. Further, the address bus 78 is coupled to a cache controller 82, which also receives CPU status signals which are extracted from the control signals outputted by the CPU 72 onto the control bus 80. The cache controller 82 outputs control signals to a cache data memory coupled to the data bus 76. This cache controller 82 includes the input circuit shown in FIG. 3, for example.

The shown system also includes a clamp signal generator 86 which is coupled to receive the HOLD request signal from the DMA controller 74 and the CPU status signals on the control bus 80. The clamp signal generator 86 generates a clamp signal to the cache controller 82.

In the above mentioned system, when the DMA controller 74 receives a DMA data transfer request from a peripheral unit such as a disc system and likes, the DMA controller 74 generates an active HOLD request signal to the CPU 72. At this time, for example, if the CPU does not execute a read/modify/write access operation to a main memory (not shown) (this can be known from the CPU status signals), the clamp signal generator 86 then generates a clamp signal in response to the active HOLD request signal. Thus, all the address input and the CPU status signal input to the cache controller 82 are rendered to a logically low level by the action of the input circuit shown in FIG. 3.

After the CPU 72 has completed the bus cycle which had been in the way of the execution when the CPU had received the active HOLD request signal, the CPU 72 brings their address output terminal, status signal output terminal and data input/output terminal into a high impedance condition, and then outputs an active HOLD acknowledge signal to the DMA controller 74. As a result, the DMA controller 74 executes a data transfer between the main memory and one peripheral unit through no intermediary of the CPU 72.

On the other hand, when the DMA controller 74 generates the active HOLD request signal, if the CPU is in the way of the execution of the read/modify/write access operation to the main memory, the clamp signal generator 86 does not generate the active clamp signal until the bus cycle is brought into a write cycle. After the bus cycle has been brought into the write cycle (this can been known by the CPU status signals), the clamp signal generator 86 generates the active clamp signal. On the other hand, similarly to the above mentioned case, the CPU brings their address output terminal, status signal output terminal and data input/output terminal into a high impedance condition, and then outputs an active HOLD acknowledge signal to the DMA controller 74.

As seen from the above description, the cache controller in accordance with the present invention will clamp the address signal and/or the control signal to a predetermined logic level when the address signal and/or the control signal outputted from the CPU assumes a high impedance condition without using the conventional pull-up circuit. Therefore, the delay of the address signal and/or the control signal can be minimized.

The invention has thus shown and described with reference to the specific embodiments. However, it should be noted that the present invention is in no way limited to the details of the illustrated structures but changes and modifications may be made within the scope of the appended claims.

I claim:

1. A system comprising:
   a microprocessor and a DMA controller which are coupled to a data bus, an address bus and a control bus, the DMA controller generating a HOLD request signal which is supplied to the microprocessor, and the microprocessor responding to the HOLD request signal by outputting a HOLD acknowledge signal to the DMA controller and by bringing terminals of the microprocessor connected to the data bus, to the address bus, and to the control bus into a high impedance condition,
   a cache data memory coupled to the data bus,
   a cache controller having an address signal input terminal coupled to the address bus for receiving an address signal from the microprocessor and a control signal input terminal coupled to the control bus so as to receive CPU status signals contained in a control signal outputted by the microprocessor onto the control bus, and
   a clamp signal generator coupled to receive the HOLD request signal from the DMA controller and the CPU status signals on the control bus, the clamp signal generator generating a clamp signal and outputting the clamp signal to the cache controller if the HOLD request signal becomes active when the CPU status signals indicate a predetermined condition, the cache controller further including a clamp signal input terminal coupled to receive the clamp signal from the clamp signal generator, a first signal input circuit coupled to the address signal input terminal to produce an internal address signal, a second signal input circuit coupled to the control signal input terminal to produce an internal control signal, and means coupled to the clamp signal input terminal and to the first and second input circuits for causing the first and second input circuits to respond to the address signal and to the CPU status signals to produce the internal address signal and the internal control signal, respectively, when the clamp signal is inactive, and for causing the first and second input circuits to clamp the internal address signal and the internal control signal at a predetermined logic level, respectively, irrespective of potential levels at the address signal input terminal and at the control signal input terminal, when the clamp signal is active.

2. A cache controller coupled to a cache memory for controlling the cache memory in response to a signal from a microprocessor, the cache controller comprising:
   an address signal input terminal and a control signal input terminal coupling through a bus to the microprocessor to receive an address signal and a control signal from the microprocessor;
   a clamp signal input terminal coupled to receive from the microprocessor a clamp signal which is rendered active when the microprocessor brings, into a high impedance condition, terminals of the microprocessor for outputting the address signal and the control signal, the bus being subjected to take an intermediate level between one logic level and another logic level by the microprocessor bringing the terminals of the microprocessor into the high impedance condition;
   a signal input circuit, coupled to the address signal input terminal and to the control signal input terminal, to receive signals on the bus to produce an internal address signal and an internal control signal; and
   means, coupled to the clamp signal input terminal and to the signal input circuit, for causing the signal input circuit to respond to the address signal and the control signal from the microprocessor to produce the internal address signal and the internal control signal, when the clamp signal is inactive, and for causing the signal input circuit to clamp the internal address signal and the internal control signal at a predetermined logic level irrespective of the intermediate level of the bus, when the clamp signal is active.

3. A cache controller as claimed in claim 2 wherein the input means includes a first AND gate having a first non-inverted input connected to the address signal input terminal, a second inverted input connected to the clamp signal input terminal, and an output connected to an address output terminal, and a second AND gate having a first non-inverted input connected to the control signal input terminal, a second inverted input connected to the clamp signal input terminal, and an output connected to a control signal output terminal.

4. A cache controller as claimed in claim 3 wherein each of the first and second AND gates includes at least one AND circuit which includes a first input connected to receive one bit of the signal supplied to one of the address signal input terminal and the control signal input terminal, a second input connected to receive an inverted signal of the clamp signal supplied to the clamp signal input terminal, a pair of p-channel transistors having their respective gates connected to the first input and the second input and also having commonly connected sources connected to a supply voltage, the p-channel transistors being commonly connected at their drains, a pair of series-connected n-channel transistors connected between ground and the commonly connected drains of the p-channel transistors, the n-channel transistors being connected at their gates to the first and second inputs, respectively, and an inverter having an input connected to the commonly connected drains of the p-channel transistors.

5. A cache controller as claimed in claim 3 further including a plurality of clamp signal input terminals connected to a logic circuit for generating a resultant clamp signal which is supplied to the second inverted input of each of the first and second AND gates.

6. A cache controller as claimed in claim 2 further including a plurality of clamp signal input terminals connected to a logic circuit for generating a resultant clamp signal which is supplied to the input means.

7. A cache controller as claimed in claim 1 wherein the cache controller includes a first AND gate having a first non-inverted input connected to receive the address signal, a second inverted input connected to receive the clamp signal, and an output generating an address signal, and a second AND gate having a first non-inverted input connected to receive the CPU status signal, a second inverted input connected to receive the clamp signal, and an output generating a control signal.

8. A cache controller coupled to a cache memory for controlling the cache memory in reponse to a signal from a microprocessor, the cache controller comprising:
an address signal input terminal coupled to receive an address signal from the microprocessor;
a clamp signal input terminal coupled to the microprocessor to receive a clamp signal which is rendered active when the microprocessor brings, into a high impedance condition, a terminal of the microprocessor for outputting the address signal;
an address input circuit, coupled to the address signal input terminal, to produce an internal address signal; and
means, coupled to the clamp signal input terminal and to the address input circuit, for causing the address input circuit to respond to the address signal from the microprocessor to produce the internal address signal, which changes between logic levels in response to a change in a logic level of the address signal, when the clamp signal is inactive, and for causing the address input circuit to clamp the internal address signal at a predetermined logic level irrespective of a potential level at the address signal input terminal, when the clamp signal is active.

9. A cache controller as claimed in claim 8 wherein the input means includes an AND gate having a first non-inverted input connected to the address input terminal, a second inverted input connected to the clamp signal input terminal, and an output connected to an address output terminal.

10. A cache controller as claimed in claim 9 wherein the AND gate includes at least one AND circuit which includes a first input connected to receive one bit of the signal supplied to the address input terminal, a second input connected to receive an inverted signal of the clamp signal supplied to the clamp signal input terminal, a pair of p-channel transistors having their respective gates connected to the first input and the second input and also having commonly connected sources connected to a supply voltage, the p-channel transistors being commonly connected at their drains, a pair of series-connected n-channel transistors connected between ground and the commonly connected drains of the p-channel transistors, the n-channel transistors being connected at their gates to the first and second inputs, respectively, and an inverter having an input connected to the commonly connected drains of the p-channel transistors.

* * * * *